Dec. 8, 1964  V. A. BRUNSON  3,160,332
AUTOMATIC PRESSURE RELIEF VALVE
Filed Dec. 14, 1960  3 Sheets-Sheet 1
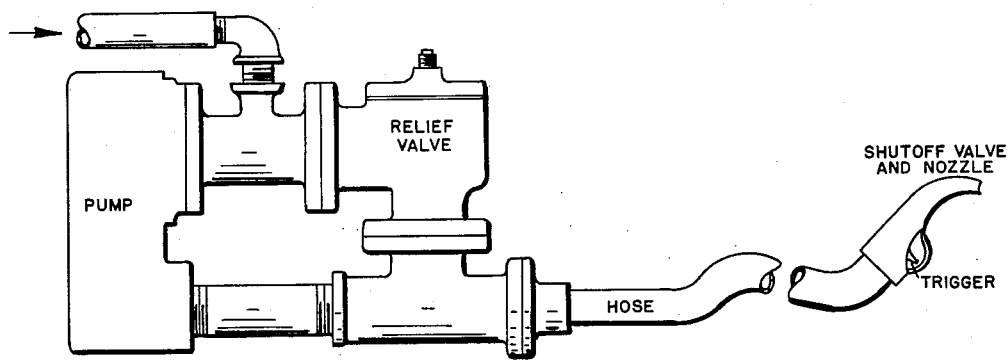
_Fig-I_
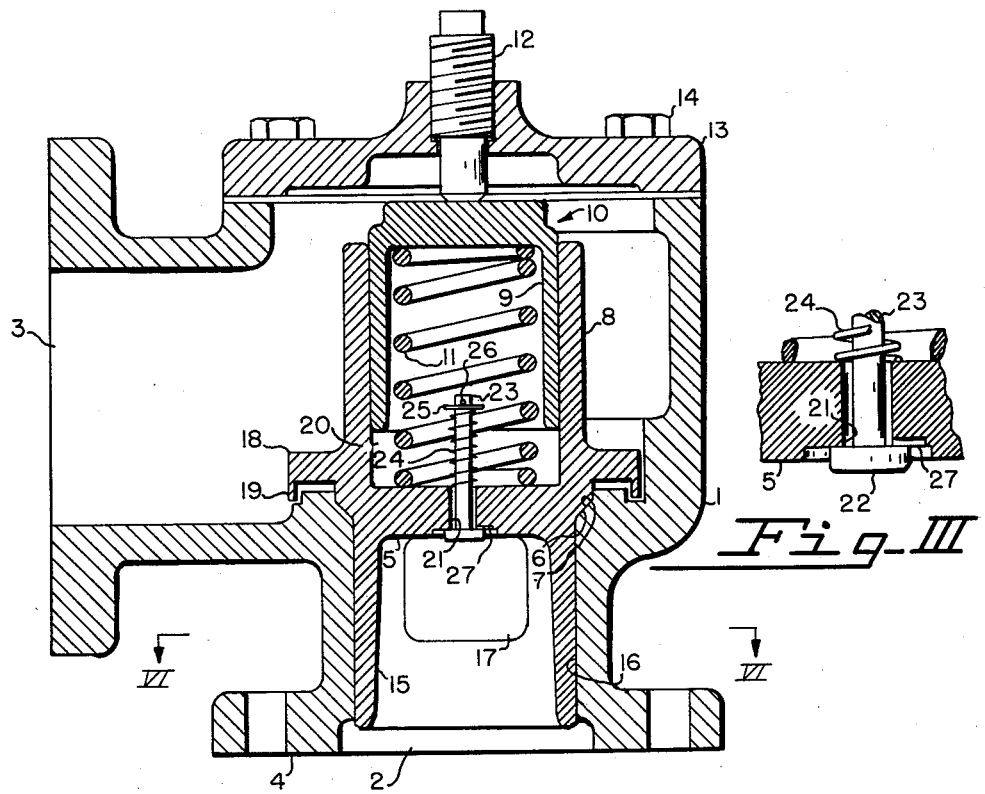
_Fig-II_  _Fig-III_
INVENTOR.
VIRGIL A. BRUNSON
BY
Marshall, Marshall & Yeasting
ATTORNEYS

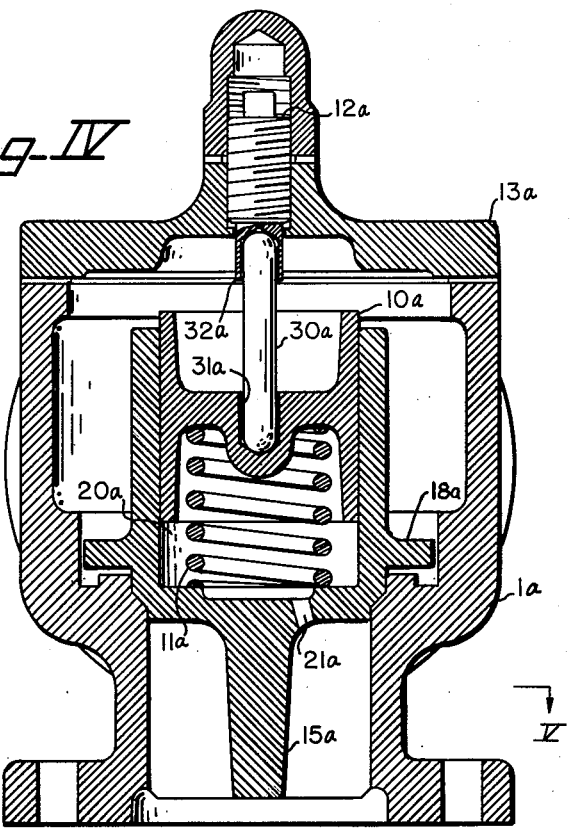
Fig IV
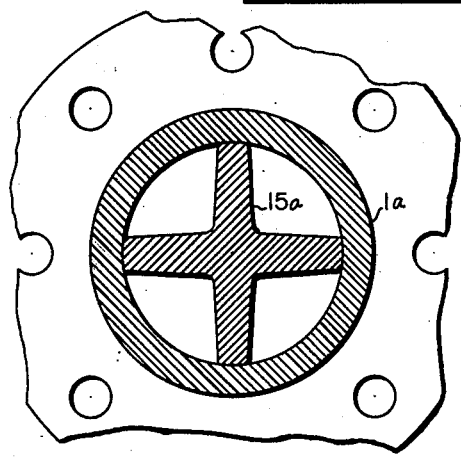
Fig V
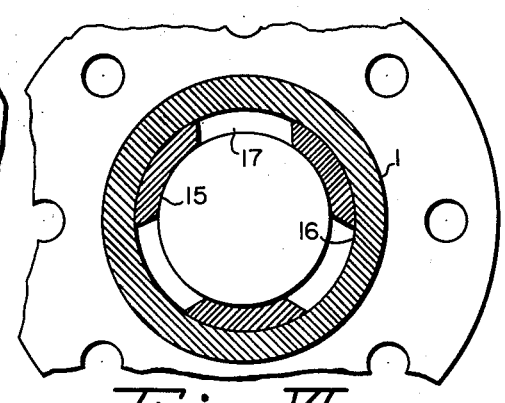
Fig VI

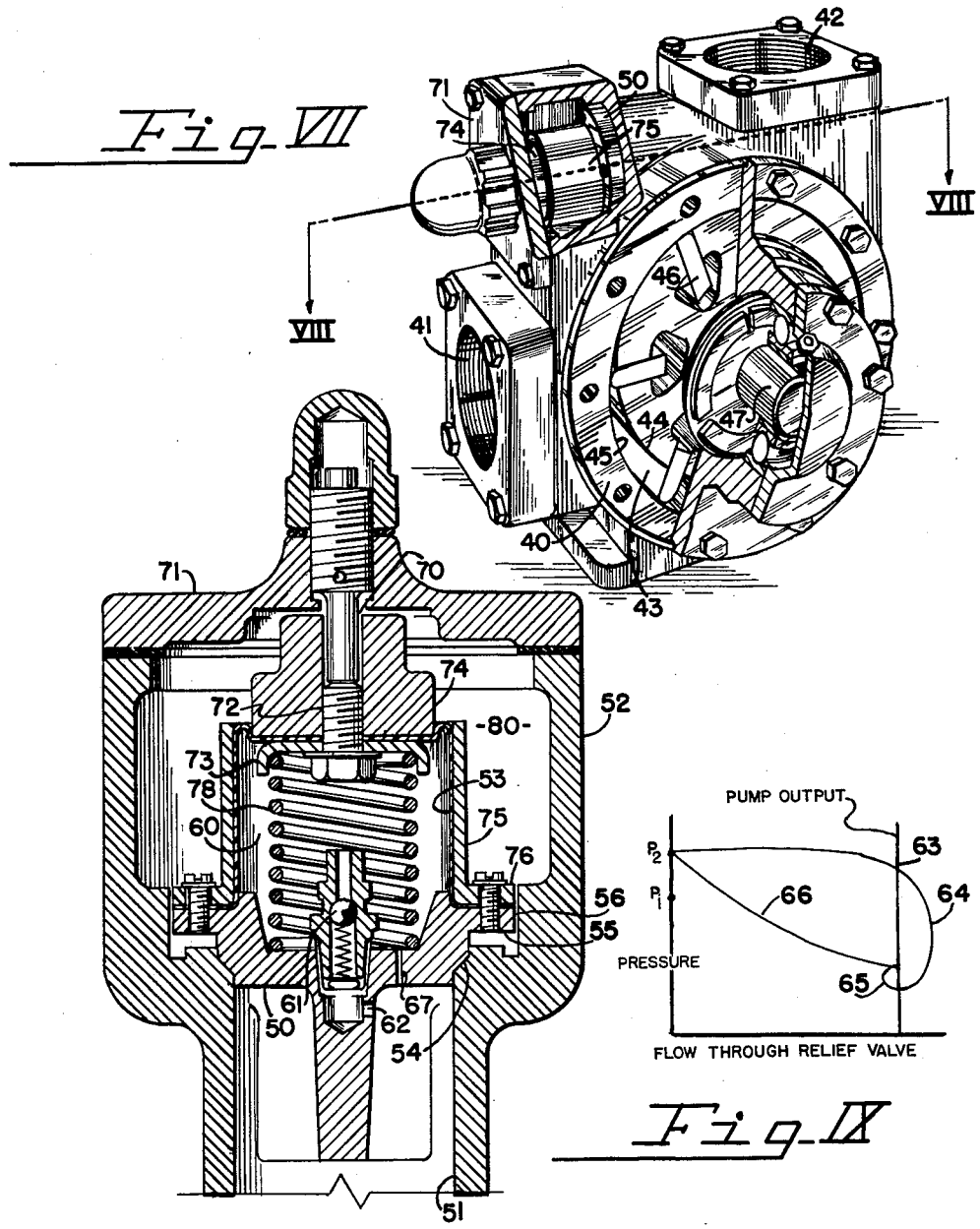

United States Patent Office 3,160,332
Patented Dec. 8, 1964

3,160,332
AUTOMATIC PRESSURE RELIEF VALVE
Virgil A. Brunson, Grand Rapids, Mich., assignor to Blackmer Pump Company, Grand Rapids, Mich., a corporation of Michigan
Filed Dec. 14, 1960, Ser. No. 75,878
8 Claims. (Cl. 222—318)

This invention relates to relief valves of the type employed to relieve excessive pressures in liquids delivered by positive displacement pumps and in particular to a relief valve system that reduces the output pressure of the pump as its discharge system is restricted.

This is a continuation in part of my application Serial No. 852,345 filed November 12, 1959, now abandoned.

Fuel oil is customarily supplied at intervals to tanks on the premises of consumers by tank trucks that are equipped with positive displacement or centrifugal pumps, meters, and lengths of hose that are carried on reels and have nozzles which can be connected to inlet fittings of consumers' tanks and which are provided with shutoff valves.

In order to control the pressure during delivery of fluid, relief valves of the general type to which this invention relates usually are incorporated in the delivery systems. Such a relief valve is connected between the high pressure discharge side of the pump and the low pressure suction side of the pump or the supply tank. It remains closed while the pressure at the discharge side of the pump is low, but opens to relieve the pressure and return some of the fuel oil back to the suction side of the pump or into the truck tank whenever the pressure at the discharge side gets too high.

Relief valves of prior art designs are acceptably adequate while fuel oil delivery apparatus is operated at comparatively low rates of flow, e.g. 40 g.p.m. Owners and operators of oil delivery tank trucks have found however that important economies can be effected by minimizing the time required per delivery, thus reducing the number of tank trucks that must be purchased, housed and maintained and on which taxes must be paid; and thus also reducing the man hours required to serve any given area. Therefore they pump the oil at the fastest practicable speed. The pumping rate in many instances has been increased from a former usual rate of about 40 g.p.m. to 100 g.p.m. or more. This high pumping rate requires high operating pressures varying somewhat with various designs of equipment from 100 p.s.i. more or less to 150 p.s.i. or more. The relief valve should remain closed during regular high speed delivery from the pump even though the pressure in the delivery line may be high.

When a consumer's tank is filled to a desired level the shutoff valve at the nozzle is closed and the hose leading from the pump to the nozzle remains filled with oil at pump discharge pressure. It is desirable to reduce the pressure before it is reeled up for transportation to the next delivery location.

This is desirable because a hose containing liquid under pressure of 100 p.s.i. or more is very rigid, very hard to handle and difficult to reel up.

It is an important object of this invention to provide a relief valve which maintains high pressures when oil is being pumped at comparatively high flow rates through delivery conduits to which the relief valve is connected but which, as the delivery rate is decreased or stopped and the pump output flows through the relief valve, decreases the pressures in the delivery conduits.

The above mentioned object is accomplished in the relief valve of this invention by arranging the valve so that it is urged toward its closed position by a hydraulic pressure generally equal to the pressure to be regulated or relieved acting on a first area of the valve plus the resilient force exerted by a spring, and is urged toward its open position by the hydraulic pressure to be regulated acting on a second area of the valve. The second area (by design of the valve, its seat and the surrounding part of the housing), in effect, progressively increases from a minimum, that is somewhat greater than the first area, to a larger area as the flow through the valve increases. The differential area, i.e. the difference between the second and first areas, may double or even quadruple as the flow through the valve increases from zero to the full delivery rate of the pump. Since the spring, in effect, works against the differential area the regulated pressure may drop to one-half or one-fourth of the original pressure as the flow through the valve increases. When the improved valve of this invention is used with a positive displacement or centrifugal pump the output pressure of the pump may be arranged to vary from, for example, 25 p.s.i. at zero delivery to 100 p.s.i. at full delivery when there is little or no flow through the improved relief valve of this invention.

An ancillary object of the invention is to provide a valve of the type outlined above which can open rapidly and close slowly. This is accomplished in the instant invention by adding an expansible chamber containing fluid under pressure to supplement the spring in keeping the relief valve closed during pumping, and equipping the chamber with a supplementary valve and providing means whereby said supplementary valve opens under conditions in which quick opening of the main relief valve is necessary.

A still further object of the invention is to correlate the flow to the expansible chamber with the elasticity of the discharge system supplied by the pump to minimize hunting or surging of the output pressure of the pump.

A still further object of the invention is to eliminate the friction and possible binding in the movable portions of the walls of the expansible chamber and thus minimize the tendencies of the valve to hunt or surge.

The relief valve of this invention retains some valuable prior art features such as the differential between the pressure required to open the valve and the lower pressure at which the valve again will close.

Briefly outlined the liquid delivery system of the instant invention consists of a positive displacement or centrifugal pump having an intake side and an output side, the intake side being connected to a source of supply and the output side being connected to a conduit which includes a hose that is adapted to be alternatively coiled or extended, the conduit terminating in a nozzle which includes a shutoff valve. The liquid delivery system also includes a novel relief valve having its inlet connected to the conduit at the output side of the pump and having its outlet connected to the intake side of the pump or to the source of supply.

The novel relief valve is so constructed and arranged that hydraulic pressure from the conduit tends to "crack" the relief valve. The relief valve also includes an expansible chamber adapted to contain liquid under pressure and means whereby expansion of the chamber acts to partially counterbalance the tendency of hydraulic pressure from the conduit to "crack" the relief valve, and is equipped with a spring which acts to additionally counterbalance the tendency of hydraulic pressure from the conduit to "crack" the relief valve.

The counterbalancing force of the spring can be adjusted to maintain a predetermined maximum pressure within the conduit when the pump is delivering its full capacity to the conduit and there is no flow through the relief valve. In this case the outlet pressure of the pump acts against the minimum differential area of the valve and the spring force overbalances the pressure on such differential area. If the discharge is throttled the pressure in the conduit rises until the hydraulic force acting on the minimum differential area overcomes the spring force and the valve opens to divert some of the flow back to the supply tank or pump inlet. As the valve opens the differential area increases so that less pressure is required to overcome the spring force. The increase in the differential area with valve opening can be adjusted by design. A three or four to one increase in differential area is easily obtainable so that the conduit pressure may drop to 25 or 30 percent of the maximum pressure if the conduit flow is low or stopped and the pump is delivering enough liquid to hold the relief valve fully open.

Numerous advantages of the invention will become apparent from the following detailed description as illustrated by the accompanying drawings in which:

FIG. I is a schematic drawing showing the system as above outlined;

FIG. II is a sectional view showing the interior construction of one form of the novel relief valve that is incorporated in the system of FIG. I;

FIG. III is a further enlarged fragmentary view partly in section showing means responsive to an abnormal increase in pressure to release liquid from an expansible chamber and means to bleed liquid into and out of such expansible chamber;

FIG. IV is a sectional view of a modified form of the novel relief valve the scale being the same as the scale of FIG. II the view being taken from a direction perpendicular to the direction from which the view of FIG. II is taken;

FIG. V is a sectional view taken as indicated by the arrows V—V of FIG. IV; and

FIG. VI is a sectional view taken as indicated by the arrows VI—VI of FIG. II.

FIG. VII is a partially broken away perspective view of a commercial pump including a built-in relief constructed according to the invention.

FIG. VIII is a fragmentary horizontal section taken substantially along the line VIII—VIII of FIG. VII.

FIG. IX is a graph illustrating the operation of a pump including the improved valve.

The accompanying drawings and the following description illustrate and describe preferred forms of the instant invention but they are not intended to impose limitations on its scope.

The relief valve illustrated in FIGS. I, II, III and VI of the accompanying drawings comprises a hollow body 1 having an inlet port 2 and an outlet port 3. The inlet port 2 may be connected by means of the mounting flange 4 or otherwise to the discharge end of a positive displacement pump or other source capable of supplying oil or other liquid under pressure, which may increase from time to time until it forces the relief valve to open. Such opening of the relief valve is known in the art as "cracking." When "cracking" occurs, oil passes via the outlet port 3 back to the truck tank or to the suction side of the pump.

The valve disk 5 has an annular beveled surface 6 which, when held in engagement with an annular beveled seat 7 in the valve body 1, makes a fluid-tight joint therewith. Rising from the upper margin of the disk 5 is a cylindrical wall 8 which closely but slidably surrounds a cylindrical side 9 of an inverted cup-shaped member 10 thus forming an extensible chamber, which contains fluid under pressure as well as a helical compression spring 11. The lower end of the helical compression spring 11 presses against the upper side of the disk 5 while the upper end of the spring is seated in the upper end of the cup 10 which is pressed downwardly by an adjusting screw 12 threaded through a cover 13, the cover 13 being removably secured to the body 1 by means of cap screws 14 or equivalent means.

In order to prevent wobble or "cramp" and to insure satisfactory seating of the annular beveled surface 6 of the disk 5 in the annular beveled seat 7, the disk 5 is provided with depending pilot means 15 which slidably engages a pilot way 16. The pilot means may take the form of a hollow round plunger slidably fitting within a bore, which constitutes the pilot way 16, or the pilot means may take the form of spaced fingers. If the hollow round plunger form is employed it should have openings 17 through which fluid can flow when the relief valve is open.

Surrounding the cylinder wall 8 adjacent its lower end, as seen in the accompanying drawing, is a circular ledge 18 having a depending flange 19 around its outer margin. The circular ledge 18 and the depending flange 19 in cooperation with the immediately subjacent portion of the housing form an annular chamber that receives fluid flowing past the valve seat 7 and discharges fluid through a variable restriction between the lower edge of the flange 19 and the adjacent housing portion. The pressure in the annular chamber urges the valve toward its open position. When the valve is lifted from its seat the pressure in the annular chamber is intermediate the inlet and outlet pressure and varies according to the relative restriction or pressure drop past the valve seat 7 and past the lip 19 from a low pressure equal to the outlet pressure when the valve is closed to a higher pressure approaching the inlet pressure when the valve is open, and the restriction under the flange 19 controls the flow. By design, the annular chamber pressure can be caused to follow practically any desired pattern with respect to flow rate.

Since the force of the pressure in the annular chamber acting on the lower side of the ledge 18 adds to the force of the pressure acting on the underside of the disk 5, the area surrounded by the valve seat 7, the result is the same as considering the effective area of the lower side of the valve, the second area referred to previously, to be increased as the valve opens. Since the pressure on the lower side of the ledge 18 increases with the rate of flow the net effect is that the greater the flow the less the inlet pressure required to hold the valve open for that flow.

In the form of relief valve embodying this invention which is illustrated by FIG. II of the accompanying drawings the cylindrical wall 8 and the cylindrical side 9 of the inverted cup-shaped member 10 are telescoped to form an expansible chamber 20 surrounding the expansive spring 11. The expansible chamber 20 is connected to the inlet port 2 of the relief valve body 1 by a hole 21 the lower end of which is restricted by a button 22 from which a stem 23 projects upwardly through the hole 21. A light helical spring 24 compressed slightly between the top of the disk 5 and a washer 25 serves to yieldably hold the button 22 in the position shown in the drawings, in which it acts as a nearly complete closure for the hole 21. The washer 25 is held upon the stem 23 by means of a pin 26.

If the button 22 were a fluid tight closure for the hole 21 the pressure below the disk 5 would not be communicated to the expansible chamber 20. A small groove 27, however, permits oil to bleed under the button 22 to the hole 21 around the stem 23 and thence into the expansible chamber. The valve closing pressure of the oil against the end of the expansible chamber 20 (the first area referred to previously) acts to supplement the force of the spring 11 in normally holding the beveled surface 6 against the seat 7 but in the event that a sufficient increase in pressure on the greater area of the lower side of the disk 5 (the second area) causes the wall 8 to telescope upwardly over the cup-shaped member 10 and raise the pressure of the liquid within the expansible chamber, the incompressible liquid will flow downwardly through the hole 21 and out around the button 22 thus permitting the disk 5 to rise and separate the beveled surface 6 from the seat 7. Thus the relief valve can open quickly upon a sudden increase in pressure below the disk 5, such as may occur if the flow of oil is suddenly stopped at the nozzle while the pump is running. The button 22 partially checks ingress of liquid into the expansible chamber 20 but permits relatively free egress therefrom. It tends to damp out rythmical cracking and closing of the relief valve, sometimes called "hunting."

After the pump has stopped and enough fluid has leaked back through the pump to drop the output pressure to atmospheric pressure, the small groove permits pressure to bleed out of the expansible chamber until only the spring 11 is holding the relief valve closed.

In the system schematically illustrated in FIG. I the pump and the relief valve are shown as distinct units connected by piping. The relief valve may however be incorporated with the pump in a single casing.

FIG. IV is a view of a modified form of the device, in section taken from a direction at a right angle to the direction from which the view in section of FIG. II is taken. The mechanism illustrated by FIG. IV differs from that illustrated in FIG. II in the following particulars:

(a) The small check valve illustrated by FIG. III is omitted. By properly proportioning the size of the hole 21a relative to the size of the chamber 20a and properly adjusting the compression of the spring 11a the relief valve shown in FIG. IV can be made to function in some environments smoothly and without hunting, even when incorporated in systems with centrifugal pumps.

(b) A piston-shaped member 10a is substituted for the inverted cup-shaped member 10 and a strut 30a having rounded ends is interposed between a socket 31a, located at the diametric center and adjacent the axial center of the piston-shaped member and an adjustably mounted socket 32a which can be positioned by an adjusting screw 12a in a cover 13a. The strut and socket structure of FIG. IV obviates the necessity of precisely accurate alignment of the axes of the piston-shaped member 10a and the chamber 20a with the axis of the adjusting screw 12a.

(c) The pilot means 15a shown in FIGS. IV and V is cruciform rather than circular. The pilot means 15a may have three or more vanes, as desired.

(d) The depending flange 19 is omitted so that the circular ledge 18a functions more like the edge of a simple plunger within the circumjacent portion of the housing 1a.

The improved valve assembly for controlling the discharge pressure of a pump may be formed integrally with the pump as illustrated in FIGURE VII. As shown in this figure a rotary vane type pump is formed with a housing 40 having an inlet port 41 and a discharge port 42. As ordinarily installed, cooperating pipe flanges are bolted against the flat surfaces surrounding the inlet and outlet ports to form the connections to the pump. These ports communicate through interior passages in the housing 40 with a crescent shaped space 43 formed between a circular rotor 44 and an eccentric bore 45 in the housing 40. A plurality of vanes 46 radially slidable in the rotor 44 are continually urged radially outwardly to maintain contact with the eccentric bore 45 and thus form the usual pumping chambers in the crescent shaped space 43 as the rotor turns with its shaft 47.

Except for the small amount of leakage past the vanes, a vane type pump is a positive displacement pump and its pumping capacity is directly proportional to the volume of the crescent shaped space and to the speed of rotation.

When a positive displacement pump is used with a delivery hose and nozzle as shown in FIG. I it is necessary to make provision for the discharge of the pump when the nozzle is closed. This is accomplished in the pump itself by providing a relief valve 50 that normally closes a return passage 51 formed in the upper portion of the housing 40. The relief valve 50 and cooperating portions 52 of the housing 40 are illustrated in detail in FIG. VIII.

This relief valve is functionally similar to the relief valve shown in FIG. II except that the rigid cup shaped piston 10 of FIG. II has been replaced with a "Bellofram" diaphragm 53. Also the depending lip 19 of the ledge 18 has been eliminated.

The valve 50, in common with that shown in FIG. II, has the property that as long as the valve is closed, as illustrated, it will resist a relatively high pressure, in the neighborhood of 100–110 pounds per square inch, so that the pump can supply its full delivery against the back pressure of an output line as long as the back pressure at the pump does not exceed the valve setting. Obviously, if the full discharge of the pump can be transmitted through the hose line with a lesser pressure drop the output pressure of the pump will drop to the actual back pressure of the hose line. If the nozzle at the end of the hose line, the discharge system of the pump, is closed or partially closed to restrict the flow the pressure in the hose line increases until a pressure sufficient to open the valve 50 is reached. When this occurs the flow through the valve past its valve seat 54 and acting on an annular surface 55 of a skirt 56 of the valve provides additional force urging the valve toward its open position. This additional force reduces the pressure required to hold the valve in its open position thereby decreasing the pressure in the outlet port 42 of the pump.

Referring also to FIG. IX the operation of the valve may be traced by assuming that initially the pump is delivering its full output into the hose line, such as the hose line of FIG. I, and that for the particular speed of operation of the pump a pressure of perhaps 80 pounds per square inch is required to overcome the pressure drop in the hose line and the pressure drop through the nozzle. This pressure may be represented by a point $P_1$ on the pressure axis on the diagram of FIG. IX. If the nozzle at the end of the hose line is suddenly closed the pressure at the outlet port 42 of the pump rises to a pressure $P_2$ at which the relief valve 50 starts to open. In order to open, the relief valve 50 must discharge liquid from within its expansible chamber 60 past a ball check valve 61 and out through a duct 62 into the inlet passage 51 of the valve. The pressure in the chamber 60 opposes the opening movement of the valve and thus causes the valve to maintain a pressure approximately equal to $P_2$ even though the fluid flowing from the passage 51 and acting against the surface 55 tends to supply more opening force for each unit of pressure. As the flow through the valve approaches the discharge flow of the pump, as indicated by the vertical line 63 of the diagram, the pressure drops. In an ordinary system the flow through the valve 50 momentarily exceeds the output flow of the pump, because of the return flow from the hose line produced by its elasticity and the pressure drops, as along the branch 64 of the curve, while the hose line recovers from the high pressure. The pressure in the chamber 60 also drops as the force against the valve drops. Ordinarily the return flow from the hose line, because of its inertia, causes the pressure in the hose line to drop below the pressure at which the system stabilizes so that there must be some return flow from the pump into the hose line to reach final equilibrium. This is indicated by the hooked portion 65 of the curve where the flow through the relief valve is shown to be less than the discharge of the pump as indicated by the line 63.

A second curve 66 in the diagram indicates the steady state pressures required to hold the valve open for various flow rates through the valve. Thus when the flow rate through the valve is practically zero a pressure of $P_2$ is required to open the valve. As the flow rate increases the pressure required to hold the valve open decreases along the curve 66. The equilibrium pressure, therefore, following a sudden closing of the nozzle is finally reached when the curve 64, passes the hooked portion 65 and finally intercepts the curve 66 at the vertical line 63 representing the discharge of the pump.

Any system exhibiting a pressure versus flow characteristic such as depicted by the curve 66 of FIG. IX will surge or hunt if there is substantial elasticity in the discharge system. For example, if the pump is discharging into an open tank, an example of a system having great elasticity or storage capacity for a given pressure change, and the relief valve 50 is adjusted to open when the tank is nearly filled, the pump delivers its full output into the tank with its relief valve closed until the tank is nearly filled. Then the relief valve opens permitting the liquid being pumped to circulate back to the inlet of the pump and hence back to the supply tank. At the same time because of the drop in pressure as exhibited by the line 66 additional fluid flows from the open tank back through the relief valve to the supply tank and this continues until the open tank has drained down to a pressure corresponding to the low point of the curve 66. As the flow through the relief valve, which was equal to the discharge from the pump plus the flow from the open tank decreases and approaches a valve equal to the flow from the pump the valve closes part way and the pressure tends to increase. A slight increase in pressure would cause some liquid to flow to the open tank thus still further reducing the flow through the relief valve so that it closes still further and the pressure rises. The process is cumulative as the discharge valve closes quite rapidly and the pump then delivers its full output into the open tank. This is known as a condition of hunting because the system will not stabilize at any intermediate filling of the tank but rather recycles at a rate determined by the size of the pump and tank.

As an example of the other extreme the discharge port 42 of the pump may be closed by a valve at that point so that there is no elasticity in the discharge system. In this case the flow through the relief valve is always exactly equal to the discharge of the pump so that the pressure varies instantly to follow any changes in flow or in the position of the relief valve 50.

In any actual system there is some resiliency in the hose line and also in the air cushion in any air eliminator that may be employed in the line between the pump and the nozzle. Thus any practical system will tend to hunt when used with this type of relief valve unless the valve itself has means for minimizing this instability.

The damping means employed in the valves constructed according to the invention consists in the small orifice 27 as shown in FIGS. II and III or a small drilled passage 67 drilled through the disk of the valve 50 to provide communication between the duct 51 and the expansible chamber 60. The size of this opening regulates the speed with which liquid can flow into the expansible chamber and hence regulates the speed at which the valve may reclose following a reduction in flow through the valve. One criteria of stability at intermediate or low delivery rates through the hose line in a system of this nature is that the flow past the relief valve must increase as the pressure in the discharge duct of the pump increases. With a constant pump output, the flow through the relief valve must increase while the flow into the hose line or output system decreases as the pressure in the system rises. This condition cannot be achieved when the pump is pumping into an open tank, having great resilience, because of the practical impossibility of sufficiently delaying the closing motion of the valve 50. However for ordinary hose lines and the elastic volume of the ordinary air eliminator a reasonably satisfactory performance may be obtained by employing a small diameter orifice 67 to limit the rate of fluid flow into the expansible chamber and thus the rate of closure of the valve. By thus restricting the rate of build up of pressure the division of the flow of fluid between the hose line and the relief valve may be made substantially independent of the liquid flow into and from the air eliminator or the changes in volume of the hose line itself. As long as this relationship is maintained this system will stabilize at a reduced pressure when the hose line is restricted or shut off.

In order for the system to be useful it is also necessary that the pressure at the pump rise when the nozzle is opened. This is commonly known as the recovery of the system and the system will recover quickly as long as the opening of the nozzle diverts enough liquid from the relief valve so that the valve moves toward its closed position to increase the pressure. This requires operation along those portions of the curve 66 having a negative slope.

It may also be noted in this system that the equilibrium pressure reached when the nozzle is closed is dependent upon the rate of flow of fluid through the relief valve which in turn is directly related to the speed of the pump. Therefore if the pump is running at a slow speed the shutoff pressure will be relatively high while if the pump is running at normal speed the shutoff pressure is relatively low.

It has also been observed that if the pump is running above its normal speed, so that the delivery of the pump flowing through the hose line generates a pressure greater than the valve opening pressure the relief valve opens and thus reduces the output pressure. This causes a reduction in delivery through the hose line and actually reduces the amount of liquid that can be delivered by the pump system.

In the relief valve shown in detail in FIG. VIII the adjustment of the opening pressure is made by adjusting a screw 70 threaded through a cap 71 and bearing against a cap screw 72 that is part of the upper end of the expansible chamber 60. The cap screw 72 clamps a spring seat 73 in position against the cap end of the "Bellofram" 53 and holds it against a block 74 that is sleeved over the lower end of the adjusting screw 70.

The "Bellofram" 53 is radially supported by an annular wall 75 having a horizontal flange 76 clamped to the skirt 56 of the valve 50. A spring 78, corresponding to the spring 11 of FIG. II, biases the valve 50 toward its closed position.

The effective cross sectional area of the expansible chamber 60 is equal to the lower area of the block 74 plus half of the area included between the outer periphery of the block 74 and the inner periphery of the annular wall 75.

The pressure of the liquid in the duct 51, which is the same as the discharge pressure of the pump acting on the lower side of the valve 50, FIG. VIII, is counterbalanced by the spring 78 plus the pressure of the liquid within the expansible chamber 60 acting on the effective cross sectional area of the chamber. Thus the valve will tend to open when the liquid pressure in the duct 51 acting on the differential area (the area of the duct 51 less the effective area of the chamber 60) exceeds the force of the spring 78. Since the force of the spring 78 can be adjusted by means of the screw 70 the actual magnitude of the pressure may be readily adjusted. It may be noted however that this adjustment should be made with the pump in operation and delivering liquid to a discharge system so there is no flow through the relief valve 50.

The shape of the pressure flow characteristic curve 66 is determined by the area of the surface 55, the difference between the cross sectional areas of the duct 51 and the chamber 60 and the restriction through the space between the margin of the annular area 55 and the adjacent portion of the housing 52. Furthermore, while not shown in the drawings, the housing 52 is cut away on the lower side of the valve seat where it joins into a passage 80 that communicates directly with the inlet 41 of the pump. If the radial clearance, the gap at the bottom between the skirt 56 and the adjacent parts of the housing 52, is maintained very close the pressure required to hold the valve open drops very rapidly as the valve opens because the pressure under the skirt is nearly equal to the pressure in the duct 51. However if the clearance is made fairly large the restriction is small and the pressure developed under the skirt 56 is also small so that larger pressures are then required to overcome the force of the spring 78.

A "Bellofram" 53 is a substantial improvement over the sliding piston arrangement shown in FIG. II and contributes to the stability of the system because it eliminates any possibility of friction opposing motion of the valve 50. Any friction or any forces tending to oppose motion of the valve in response to the opposing hydraulic forces results in instability in that the valve cannot properly and quickly position itself to secure the proper balance of pressures in the system. This results in overshooting in both directions which is conducive to hunting or surging.

The invention, preferred forms of which are described above, includes such variations as fall within the spirit and scope of the subjoined claims.

Having described the invention, I claim:

1. A relief valve for use in a variable pressure liquid delivery system that comprises a housing having intake and exit ports and a valve seat, a valve member that cooperates with the valve seat, said valve member having one side the effective area of which is exposed to the pressure of liquid in the intake port, which effective area increases with opening of the relief valve, said member having another side of lesser effective area than the first side also exposed to the pressure of liquid in the intake port, a spring in the housing engaging said other side for urging the valve member toward its closed position with a force the increase of which with opening of the valve is substantially less than the increase of force of the liquid pressure acting on the increase in said effective area, and means to regulate the speed of closure of the valve.

2. In a relief valve for use with a pump for automatically increasing the discharge pressure of a pump with a decrease in flow through the bypass valve, in combination, a valve housing having intake and exit ports and a valve seat, and a skirted valve member that cooperates with the valve seat, a spring in the housing engaging the valve member and urging the valve member toward its closed position, said member having one area exposed at all times to the pressure of liquid in the intake port tending to open the valve, another area under the skirt exposed to the pressure of liquid flowing past the valve seat that urges the valve toward its open position with a force greater than the increase in spring force with movement of the valve and a third area opposed to and of lesser extent than said one area subjected to pressure generally equal to the pressure of liquid in the intake port, whereby the pressure drop across the valve decreases with increase in flow through the valve.

3. In a relief valve for discharging excess output of a pump, in combination, a valve housing having intake and exit ports and a valve seat, and a skirted valve member that cooperates with the valve seat to restrict flow through the valve, a spring in the housing engaging the valve member and urging such member toward its closed position, said valve member having one side exposed to intake pressure the effective area of which side increases such that the increase in force of the intake pressure acting on the increase in effective area substantially exceeds the increase in spring force as the valve opens and the skirted portion is exposed to liquid flow, an expansible chamber included in the valve member on the side opposite the first side, said chamber having an effective area that is less than the minimum effective area of the one side, and means including a check valve connecting the chamber to the inlet port for limiting the rate of flow into the expansible chamber from the intake port while permitting relatively free flow from the chamber.

4. In a relief valve for discharging excess output of a pump, in combination, a valve housing having intake and exit ports and a valve seat at least partially surrounded by a cylindrical portion of the housing, a valve member that comprises a valve disk that cooperates with the valve seat, a spring in the housing engaging the valve member and urging it toward the valve seat, a skirt on the valve member surrounding the disk and cooperating with the cylindrical portion for increasing the effective area of the disk as the valve opens the ratio of the incremental increase in effective area to the effective area being greater than the ratio of the incremental increase in spring force to the spring force, an expansible chamber having a flexible non-stretchable wall acting between the disk and a fixed support in the housing, and means including a check valve connecting the expansible chamber with the intake of the valve.

5. A liquid delivery system comprising, in combination, a pump having an intake and an outlet, the inlet being adapted to be connected to a source of liquid, a delivery conduit connected to the outlet of the pump, valve means at the discharge end of the delivery conduit for controlling the flow of liquid through the delivery conduit, a relief valve connected between the outlet and intake of the pump, said relief valve comprising a valve member having a first area which increases with opening of the valve against which fluid in the outlet acts tending to open the valve and a second area smaller than said first area against which fluid at outlet pressure acts tending to close the valve, a spring in the relief valve engaging the valve member and urging the valve member toward its closed position, said valve member and spring being adapted to substantially reduce the pressure in said outlet as flow through the relief valve increases, and means for limiting the velocity of movement of the valve member only during movement toward its closed position.

6. A liquid delivery system comprising, in combination, a positive displacement pump having an intake and an outlet, the intake being adapted to be connected to a source of liquid, a delivery conduit connected to the outlet of the pump, delivery valve means for controlling the flow through the delivery conduit, a pressure relief valve connected to the outlet of the pump, said relief valve comprising a valve member having a first area that varies with the opening of the valve against which liquid at outlet pressure acts to open the valve and a smaller area against which liquid substantially at outlet pressure acts tending to close the valve, a spring in the relief valve engaging the valve member for urging the valve member toward its closed position, said areas and spring being arranged such that the outlet pressure decreases with increases in flow through the valve, and means acting only during closing movements of the valve for limiting the rate of closure of the valve member to suppress rapid pressure increases in said delivery conduit.

7. A liquid delivery system according to claim 6, in which said spring and areas are proportioned such that the pressure in the delivery conduit varies from a low pressure at low flow rates through the conduit to a high pressure at high flow rates.

8. A relief valve for use in a variable pressure liquid delivery system, said relief valve comprising, in combination, a housing having a passage connecting intake and exit ports, a valve seat in the housing, a valve member cooperating with the valve seat, said valve member having on its first side an effective area exposed to liquid in the intake port that increases as the valve opens, an expansible chamber connected to the opposite side of the valve member that is in communication with the intake port and that has an effective area that is less than the effective area of the first side, a spring in the housing engaging the valve member for urging the valve member toward its closed position with a force that increases with opening movement of the valve member in an amount that is less than the increase in force of the liquid acting on the increase in the effective area of said first side, and means providing a greater restriction to flow into the expansible chamber than to flow from the chamber.

References Cited in the file of this patent

UNITED STATES PATENTS

| | | |
|---|---|---|
| 58,294 | Richardson | Sept. 25, 1866 |
| 1,010,206 | Wainwright | Nov. 28, 1911 |
| 2,013,431 | Bechtold | Sept. 3, 1935 |
| 2,225,880 | Montelius | Dec. 24, 1940 |
| 2,980,132 | Prijatel et al. | Apr. 18, 1961 |